(12) United States Patent
Riley et al.

(10) Patent No.: US 7,991,414 B2
(45) Date of Patent: Aug. 2, 2011

(54) POSITION COMPUTATION IN A POSITIONING SYSTEM USING SYNCHRONIZATION TIME BIAS

(75) Inventors: Wyatt Thomas Riley, Wayne, PA (US); Grant Alexander Marshall, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 12/364,399

(22) Filed: Feb. 2, 2009

(65) Prior Publication Data

US 2009/0195448 A1 Aug. 6, 2009

Related U.S. Application Data

(63) Continuation of application No. 10/632,637, filed on Jul. 31, 2003, now Pat. No. 7,499,712.

(51) Int. Cl.
*H04B 15/00* (2006.01)

(52) U.S. Cl. ........................................ 455/502; 455/12.1

(58) Field of Classification Search ............... 455/456.1, 455/502, 524, 552.1, 427, 12.1, 16; 342/464
See application file for complete search history.

(56) References Cited

U.S. PATENT DOCUMENTS

| | | | | |
|---|---|---|---|---|
| 5,398,263 | A * | 3/1995 | Vanderspool et al. | 375/376 |
| 6,188,354 | B1 | 2/2001 | Soliman et al. | |
| 6,249,253 | B1 | 6/2001 | Nielsen et al. | |
| 6,252,543 | B1 * | 6/2001 | Camp | 342/357.06 |
| 6,289,280 | B1 | 9/2001 | Fernandez-Corbaton et al. | |
| 6,424,297 | B2 | 7/2002 | Tamura et al. | |
| 6,445,927 | B1 * | 9/2002 | King et al. | 455/456.6 |
| 6,707,422 | B2 | 3/2004 | Sheynblat et al. | |
| 6,806,830 | B2 * | 10/2004 | Panasik et al. | 342/464 |
| 6,847,826 | B1 | 1/2005 | Wesby et al. | |
| 7,243,134 | B2 | 7/2007 | Bruner et al. | |
| 7,454,217 | B2 | 11/2008 | Edge et al. | |

FOREIGN PATENT DOCUMENTS

| | | |
|---|---|---|
| JP | 2002507727 | 3/2002 |
| JP | 2002512373 | 4/2002 |
| JP | 2002148326 | 5/2002 |
| WO | WO9961934 A1 | 12/1999 |
| WO | WO0133302 | 5/2001 |
| WO | WO0148506 | 7/2001 |
| WO | WO0173467 | 10/2001 |

OTHER PUBLICATIONS

International Search Report PCT/US2003/028109, International Search Authority European Patent Office, Jan. 22, 2004.

\* cited by examiner

*Primary Examiner* — Tu X Nguyen
(74) *Attorney, Agent, or Firm* — Andrea L. Mays; Arnold J. Gum

(57) ABSTRACT

In general, this disclosure is directed to techniques for computing a positioning solution for a mobile unit based on signals received from the satellite navigation system and the wireless communication system. The techniques allow for, and resolve, a synchronization bias that constrains a system time for the satellite navigation system and a system time for the wireless communication system relative to each other. The mobile unit may utilize the defined constraint to compute a position solution in environments where additional independent measurements would otherwise be required. The mobile unit may incorporate Receiver Autonomous Integrity Monitoring (RAIM) functionality to validate the position and time solutions derived from each of received signals. According to the techniques described herein, the mobile unit may be able to utilize the defined synchronization bias to apply RAIM or similar techniques in environments where such techniques would otherwise be indeterminate.

31 Claims, 4 Drawing Sheets

POSITION COMPUTATION IN A POSITIONING SYSTEM USING SYNCHRONIZATION TIME BIAS

RELATED APPLICATIONS

This application is a continuation of U.S. patent application Ser. No. 10/632,637, filed Jul. 31, 2003, entitled "POSITION COMPUTATION IN A POSITIONING SYSTEM USING SYNCHRONIZATION TIME BIAS," which claims priority to U.S. Provisional Application No. 60/408,614, FILED ON Sep. 5, 2002, both of which are assigned to the assignee hereof and which are expressly incorporated herein by reference.

TECHNICAL FIELD

This disclosure relates to positioning systems and, more particularly, to the computation of position solutions for mobile receivers.

BACKGROUND

The Global Positioning System (GPS) is a satellite navigation system designed to provide position, velocity and time information almost anywhere in the world. GPS was developed by the Unites States Department of Defense, and currently includes a constellation of twenty-four operational satellites. Other types of satellite navigation systems includes the Wide Area Augmentation System (WAAS), the Global Navigation Satellite System (GLONASS) deployed by the Russian Federation, and the Galileo system planned by the European Union.

A variety of receivers have been designed to decode the signals transmitted from the satellites for the purposes of determining position, velocity or time. In general, to decipher the signals and compute a final position, the receiver must acquire signals from the satellites in view, measure and track the received signals, and recover navigational data from the signals. By accurately measuring the distance from three different satellites, the receiver triangulates its position, i.e., solves for a latitude, longitude and altitude. In particular, the receiver measures distance by measuring the time required for each signal to travel from the respective satellite to the receiver. This requires precise time information. For this reason, measurements from a fourth satellite are typically required to help resolve time measurement errors, e.g., errors created by the inaccuracies of timing circuits within the receiver.

In certain locations, e.g., urban environments with tall buildings, the receiver may only be able to acquire signals from three or less satellites. In these situations, the receiver will be unable to resolve all four variables of the position solution: latitude, longitude, altitude, and time. If the receiver is able to acquire signals from three satellites, for example, the receiver may forego an altitude calculation to resolve latitude, longitude and time. If less than three signals are available, the receiver may be unable to calculate its position.

To address this limitation, many receivers employ hybrid location technology that makes use of signals from base stations of a wireless communication system. As with satellite signals, the hybrid receivers measure time delays of the wireless signals to measure distances from the base stations of the network. The hybrid receivers utilize the signals from the base stations, as well as any acquired signals from GPS satellites, to resolve the position and time variables. The hybrid location technique often allows a receiver to compute a position solution in a wide variety of locations where conventional positioning techniques would fail. In code division multiple access (CDMA) systems, for example, this base station measurement portion of this hybrid technique is referred to as Advanced Forward Link Trilateration (AFLT).

The accuracy of the location solution determined by the receiver is affected by the degree of time precision within the system. In synchronized systems, such as existing CDMA systems, the timing information communicated by the cellular base stations is synchronized with the timing information from the GPS satellites, allowing precise time to be available throughout the system. In some systems, such as the Global System for Mobile Communications (GSM), the timing information is not synchronized between the base stations and the GPS satellites. In these systems, Location Measurement Units (LMUs) are added to the existing infrastructure to provide precise timing information for the wireless network.

SUMMARY

In general, this disclosure is directed to techniques for computing a positioning solution for a mobile unit. In particular, the techniques allow for, and resolve, a synchronization bias that may define a difference between a system time for a satellite navigation system and a system time for a wireless communication system. Using a time bias, referred to herein as a "synchronization bias," the techniques may improve the accuracy and reliability of the position solution provided by the mobile unit.

For example, in one embodiment, a method comprises receiving signals from a satellite navigation system and signals from a wireless communication system, and determining a position solution for a mobile unit as a function of the of signals using a synchronization bias that defines a difference between a system time for the satellite navigation system and a system time for the wireless communication system.

In another embodiment, a method comprises receiving sets of position related measurements for a device, the measurements of each of the sets having a common bias with respect to the measurements of the other set. The method further comprises determining a position solution for the device as a function of the measurements and the common bias.

In another embodiment, a method comprises receiving a request from a mobile unit operating within an environment having a satellite navigation system and a wireless communication system, and communicating to the mobile unit, in response to the request, synchronization bias data that constrains a system time of the satellite navigation system as a function of a system time of the wireless communication system.

In another embodiment, a system comprises a server to store synchronization bias data that defines a difference between a system time for a satellite navigation system and a system time for a wireless communication system. The system further comprises a mobile unit to receive the synchronization bias data from the server, and determine a position solution as a function of the synchronization bias data and signals received from the satellite navigation system and the wireless communication system.

In another embodiment, an apparatus comprises one or more antennas to receive signals from a satellite navigation system and a wireless communication system. The apparatus further comprises a processor to determine a position solution for a mobile unit as a function of the signals using a synchronization bias that defines a difference between a system time for the satellite navigation system and a system time for the wireless communication system.

In another embodiment, a computer-readable medium comprises instructions for causing a programmable processor to determine a position solution for a mobile unit as a function of signals received from a satellite navigation system, signals received from a wireless communication system, and a synchronization bias that defines a difference between a system time for the satellite navigation system and a system time for the wireless communication system.

In another embodiment, a computer-readable medium comprises data structure to store one or more synchronization biases for computing position solutions for one or more mobile units, where each of the synchronization biases defines a difference between a system time for a satellite navigation system and a system time for a wireless communication system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
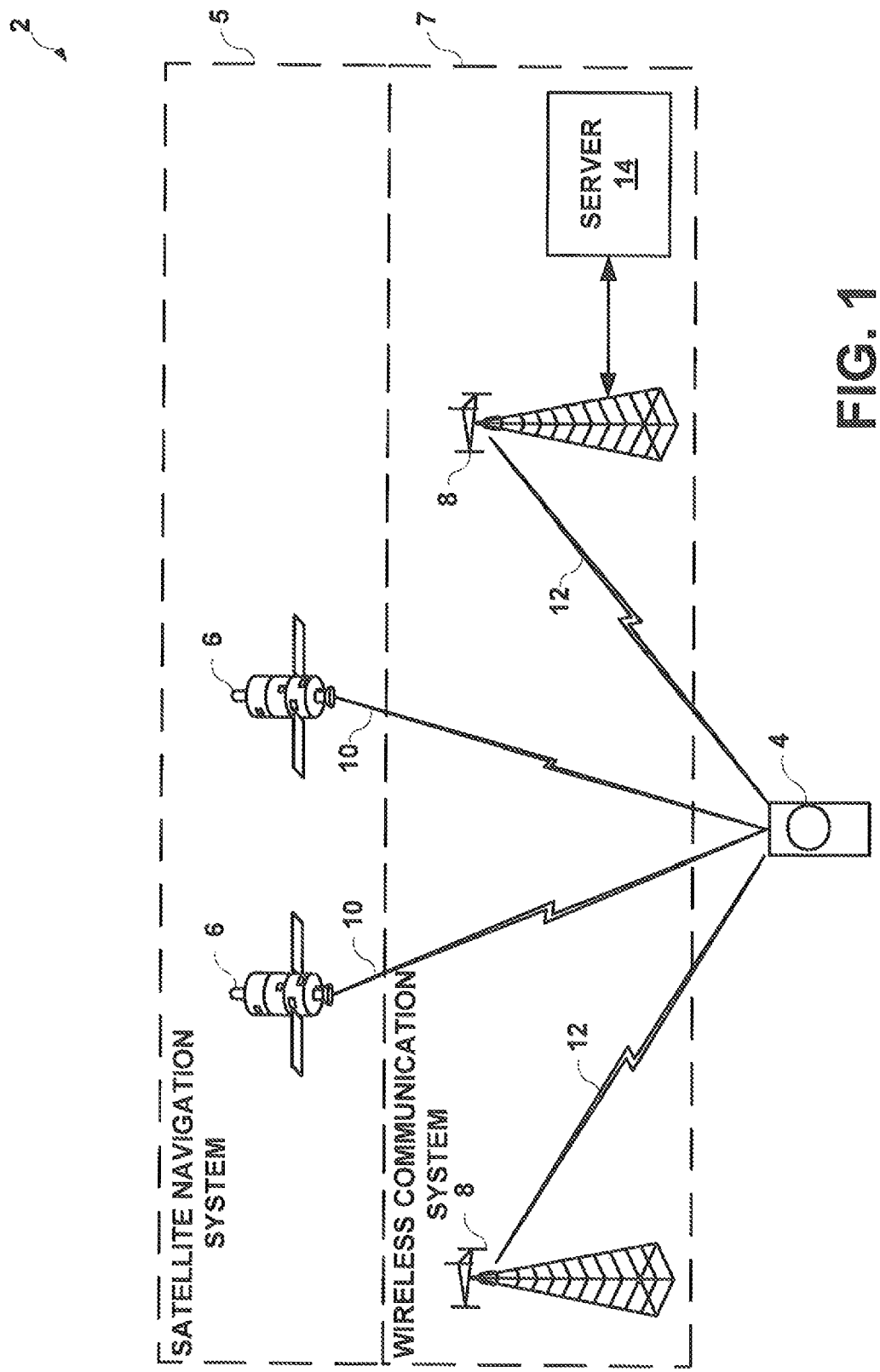
FIG. 1 is a block diagram illustrating an example system in which a mobile unit computes a position solution using a synchronization bias that constrains a system time for a wireless communications system with respect to a system time for a satellite navigation system.

FIG. 1 is a block diagram illustrating an example synchronous environment 2 in which a mobile unit 4 makes use of a "synchronization bias" to compute a position location. Environment 2 is referred to as a synchronous environment in that satellite navigation system 5 and communication network 7 are designed to have synchronous system times. In other words, satellites 6 and base stations 8 are designed to produce precisely synchronized timing information. Nevertheless, mobile unit 4 allows for, and resolves, a synchronization bias that may define a difference between the system time for satellite navigation system 5 and the system time for wireless communication system 7. An example of satellite navigation system 5 is the Global Positioning System (GPS) developed by the Unites States Department of Defense. Other types of satellite navigation systems includes the Wide Area Augmentation System (WAAS), the Global Navigation Satellite System (GLONASS) deployed by the Russian Federation, and the Galileo system planned by the European Union.

Mobile unit 4 employs techniques to compute a positioning solution based on signals 10, 12 received from satellites 6 and base stations 8, respectively. Mobile unit 4 acquires signals 10 from satellites 6 in view, and measure distance from each satellite by measuring the time required for each signal to travel from the respective satellite to mobile unit 4. Similarly, mobile unit 4 receives signals 12 from base stations 8 of wireless communication system 7, and measure distances from base stations 8 based on the time required for each wireless signal to travel from the base stations to the mobile unit. Mobile unit 4 resolves position and time variables based on the measurements.

The techniques employed by mobile unit 4 are based on the recognition that even in a synchronous environment 2, a synchronization error, i.e., a synchronization bias, may exist between the system times of satellite navigation system 5 and a wireless communication system 7. This time difference may result from a number of factors, such as different propagation delays in timing circuits employed by mobile unit 4 to process the different types of signals 10, 12. Other causes for the synchronization bias include common propagation delays within transmitters of base stations 8, and the fact that signals 12 from base stations 8 tend to arrive at mobile unit 4 at a much lower elevation angle than signals 10 from satellites 8. This lower elevation angle may cause signals 12 from base stations 8 to bounce off more objects (not shown) within environment 2 than signals 10 from satellites 6, leading to excess measurement signal path-lengths in the timing information computed by mobile unit 4 for base stations 8.

Accordingly, the synchronization bias can be viewed as a common bias between two systems, i.e., the satellite navigation system 5 and the wireless communication system 7 to which satellites 6 and base stations 8 belong, respectively. In other words, from the perspective of mobile unit 4, a common synchronization bias may exist between the two systems 5, 7, even though the systems are designed to operate synchronously in time.

In cases where systems 5,7 are considered very well synchronized, hybrid positioning techniques can be used to solve for a single receiver time in addition to latitude, longitude and altitude. In cases where the two system times are not well synchronized, referred to herein as asynchronous environments, asynchronous techniques may be used to resolve independent system times, but require an additional measurement by mobile unit 4 to produce accurate results. For example, the asynchronous techniques may require at least five measurements for resolution of five independent variables: latitude, longitude, altitude, precise time for the satellites, and precise time for the wireless network. Altitude-aiding techniques may be used to provide an extra measurement for use in calculating the position solution, thereby reducing the number of measurements needed. Nevertheless, synchronous techniques using altitude-aiding may require three measurements, while asynchronous techniques require an additional fourth measurement to compute an accurate position solution.

In these situations, mobile unit 4 may nevertheless compute an accurate position solution by utilizing a defined constraint that relates the system times, thereby allowing resolution of a position solution using asynchronous techniques without requiring an additional independent measurement. Specifically, to compensate for this synchronization error between systems 5, 7, mobile unit 4 employs location techniques that allow a synchronization bias to express the time for one of the systems 5, 7 of synchronous environment 2 as a function of the time for the other system. As one example, the synchronization bias may define the system time for one of systems 5, 7 as within a defined range from the system time of the other system. For example, mobile unit 4 may be configured to define the system time for network communication system 7 as within a time delta, e.g., ±1 microsecond, from the system time of the satellite navigation system 5. As another example, the synchronization bias may define system time for one of systems 5, 7 as a time offset from the system time of the other system. In this manner, the techniques allow the synchronization bias to be constrained, and allow the times of the systems to be related in accordance with a single equation that may be used in lieu of an additional measurement to calculate an accurate position solution.

As described in detail below, mobile unit 4 may use this additional constraint to compute a position solution. In particular, mobile unit 4 may compute the position solution as if environment 2 were an asynchronous environment, i.e., an environment having different times for satellite navigation system 5 and wireless communication network 7, but constrains the system times in accordance with the defined synchronization bias. Consequently, mobile unit 4 is referred to herein as capable of operating in a "semi-synchronous" mode to compute a position solution in synchronous environment 2. This technique may allow mobile unit 4 to compute a position solution with greater accuracy in a wide variety of locations where conventional position calculation techniques would fail or produce less accurate results.

In addition, mobile unit 4 may incorporate Receiver Autonomous Integrity Monitoring (RAIM) functionality that enables the mobile unit to validate the position and time solutions derived from each of received signals 10, 12. As described above, the successful acquisition of signals 10, 12 from at least four sources is generally required for mobile unit 4 to compute a complete position solution. The acquisition of five or more signals 10, 12 provides for redundant measurements, and often allows mobile unit 4 to detect the presence of an erroneous measurement from one or more signals, depending on the total number of signals acquired. Mobile unit 4 may utilize the redundant measurements to detect an erroneous measurement from one or more of the signals, either from the GPS system or the wireless communication system, and to isolate the measurement from the position solution computation.

According to the techniques described herein, mobile unit 4 may be able to utilize the defined synchronization bias to apply RAIM or similar techniques in environments where such techniques would be indeterminate. For example, the additional constraint defined by the synchronization bias may allow mobile unit 4 to apply RAIM when only four signals are acquired. In this environment, the additional constraint can be used to provide the redundancy that would otherwise be provided by the fifth satellite signal. If mobile unit 4 acquires more than five signals, the mobile unit may apply conventional RAIM techniques, and may incorporate the constraining synchronization bias into the validation process.

Mobile unit 4 may receive synchronization bias data from a component of wireless communication system 7, such as one of base stations 8. In particular, wireless communication system 7 may include one or more servers 14 to maintain and store synchronization bias data. Server 14 may store data that defines a system-wide synchronization bias. In addition, server 14 may store data defining a set of synchronization biases, and may associate the synchronization biases with identifiers for a plurality of mobile units 4. In other words, server 14 may maintain synchronization bias data that is specific to the particular mobile unit 4. In this manner, the synchronization bias data may compensate for fine difference in timing circuits, timing calibration, and other variations between mobile units 4. Further, server 14 may store synchronization bias data for different regions, e.g., groups of cells, within wireless network 5. Consequently, server 14 may arrange the synchronization bias data in accordance with identifiers for the respective regions of the wireless communication system.

Server 14 may store the synchronization bias data in a variety of forms, including data storage files, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. The data could, for example, be stored within a single relational database, such as SQL Server™ from Microsoft Corporation.

Mobile unit 4 may take the form of any one of a variety of mobile receivers capable of receiving satellite navigation signals 10, as well as wireless communication signals 12, for computing a position solution. Examples include a enabled mobile phone, a handheld receiver, a receiver mounted within a vehicle, such as an airplane, automobile, truck, tank, ship, and the like. Base stations 8 may communicate with mobile unit 4 in accordance with any one of a number of wireless communication protocols in a synchronous environment. One common wireless communication protocol is code division multiple access (CDMA) in which multiple communications are simultaneously conducted over a radio-frequency (RF) spectrum. In a CDMA environment, the techniques may be viewed as a mechanism for enhanced Advanced Forward Link Trilateration (AFLT). Other examples include Global System for Mobile Communications (GSM), which uses narrowband time-division multiple access for communicating data, and General Packet Radio Service (GPRS). In some embodiments, mobile unit 4 may integrate both a GPS receiver and a wireless communication device for voice or data communication.

Figure 2:
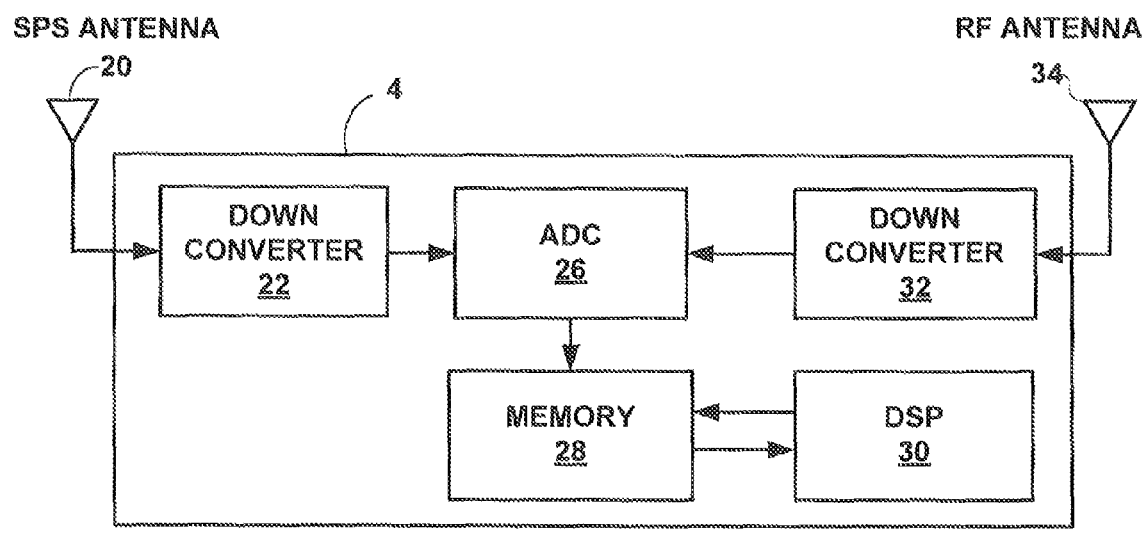
FIG. 2 is a block diagram illustrating an example embodiment of the mobile unit.

FIG. 2 is a block diagram illustrating an example mobile unit 4 in further detail. In general, mobile unit 4 includes a satellite positioning system (SPS) antenna 20, RF antenna 34, down converter 22, analog-to-digital converter (ADC) 26, memory 28, and digital signal processor (DSP) 30 for receiving and acquiring signals 10, 12 from satellites 6 and base stations 8, respectively.

Down converter 22 receives signals 10 from satellites 8 via SPS antenna 20, and convert the signals from an SPS carrier frequency to a baseband frequency for processing. Down converter 22 may first convert the signals 10 to an intermediate frequency for conditioning, and then convert the conditioned signal to the baseband frequency. Alternatively, down converter 22 may implement a zero intermediate frequency (ZIF) architecture for direct conversion to baseband. Similarly, down converter 32 converts signals 12 received from RF antenna 34 to a baseband frequency. Although a common antenna may be used for satellite and cellular communications, separate antennas may be preferred because the cellular signals 12 and satellite signals 10 typically use different RF bands.

ADC 26 samples the baseband signals to produce digitized representations of the signals, and stores the digitized representations hi memory 28. For example, memory 28 may store a contiguous set of digitized data, typically corresponding to a duration of approximately 100 ms to 1 second of the baseband signal, or longer, for use by DSP 30 during the acquisition process.

DSP 30 uses the digitized representations of the signals, as well as the synchronization bias as an additional constraint, to compute a position solution. In particular, DSP 30 may apply asynchronous position solution techniques to compute system times for satellite navigation system 5 and wireless communication network 7, but constrains the system times in accordance with the defined synchronization bias. Consequently, DSP 30 operates in a semi-synchronous mode to compute a position solution in synchronous environment 2.

DSP 30 may store data defining the synchronization bias within memory 28, internal on-chip memory, or other suitable computer-readable media. In other words, the synchronization bias may be hard-coded within mobile unit 4. Alternatively, DSP 30 may receive via RF antenna 34 synchronization bias data from a component of wireless communication system 8, such as a base station controller (not shown).

DSP 30 typically operates according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. Although described in reference to a digital signal processor, other forms of an embedded processor or controller can be used within mobile unit 4.

Figure 3:
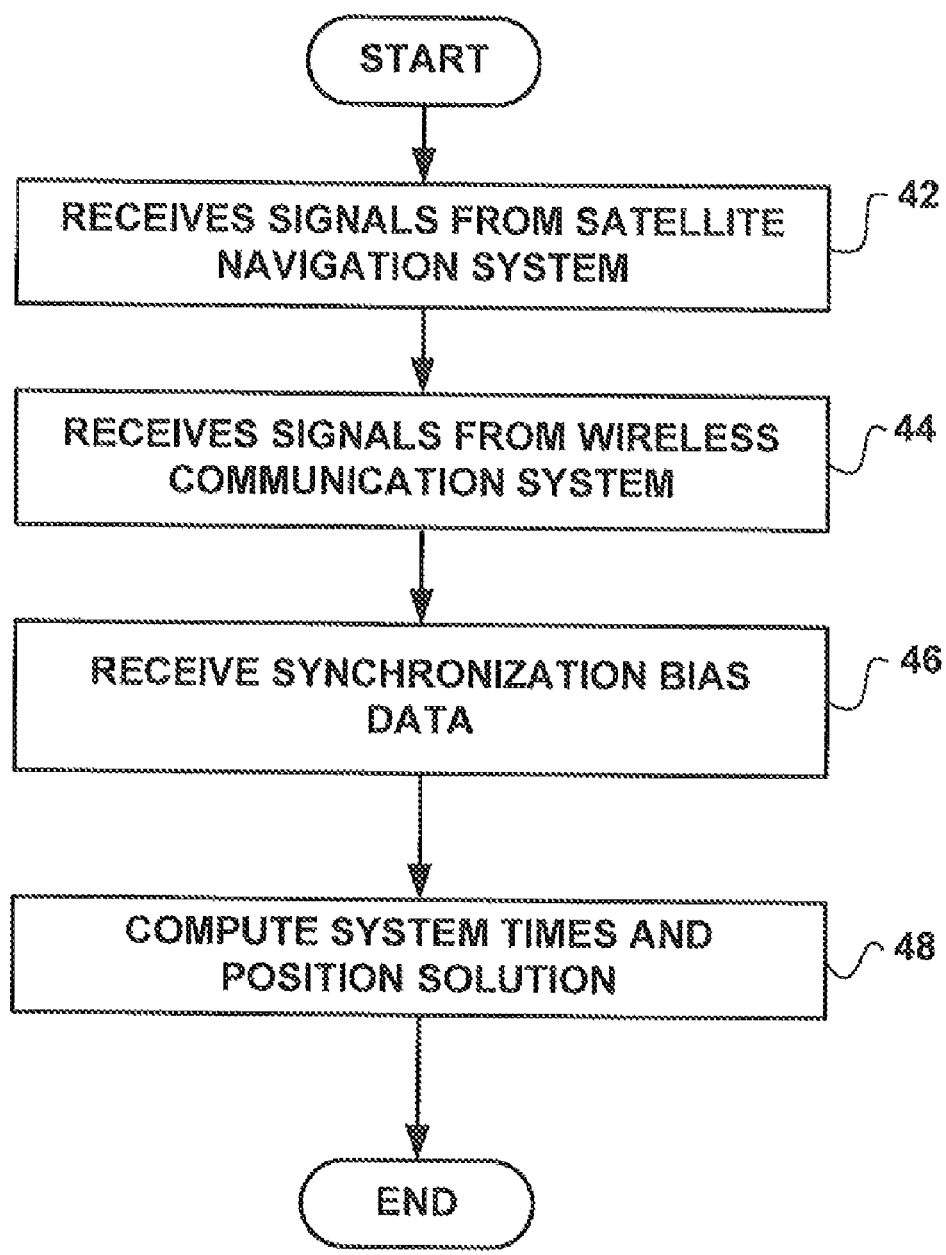
FIG. 3 is a flow chart illustrating an example mode of operation of the mobile unit.

FIG. 3 is a flow chart further illustrating exemplary operation of mobile unit 4. To compute a position solution, mobile unit 4 receives satellite signals 10 from satellite navigation system 5 via SPS antenna 20 (42), and receives RF signals 12 from wireless communication system 7 via wireless modem 32 and RF antenna 34 (44).

In addition, mobile unit 4 receives synchronization bias data that defines a difference between a system time for satellite navigation system 5 and a system time for wireless communication system 7 (46). As described above, the synchronization bias may define the system time for one of systems 5, 7 as within a defined range from the system time of the other system. As another example, the synchronization bias may define system time for one of systems 5, 7 as a time offset from the system time of the other system. Mobile unit 4 may receive the data from a component of wireless communication system 7, such as one of base station 8, which may retrieve the synchronization bias data from a central database. Alternatively, mobile unit 4 may retrieve the synchronization bias data from internal memory, as described above in reference to FIG. 2.

Based on the received signals and the defined synchronization bias, mobile unit 4 computes the system times for system 5,7 and a position solution (48). For example, mobile unit 4 may determine system times, a latitude, a longitude and an altitude for mobile unit 4 as a function of the acquired signals and the constraint defined by the synchronization bias data. Mobile unit 4 may apply asynchronous techniques to compute the position, making use of the constraining relationship defined between the system times for satellite navigation system 5 and wireless communication system 7 based on the synchronization bias.

Figure 4:
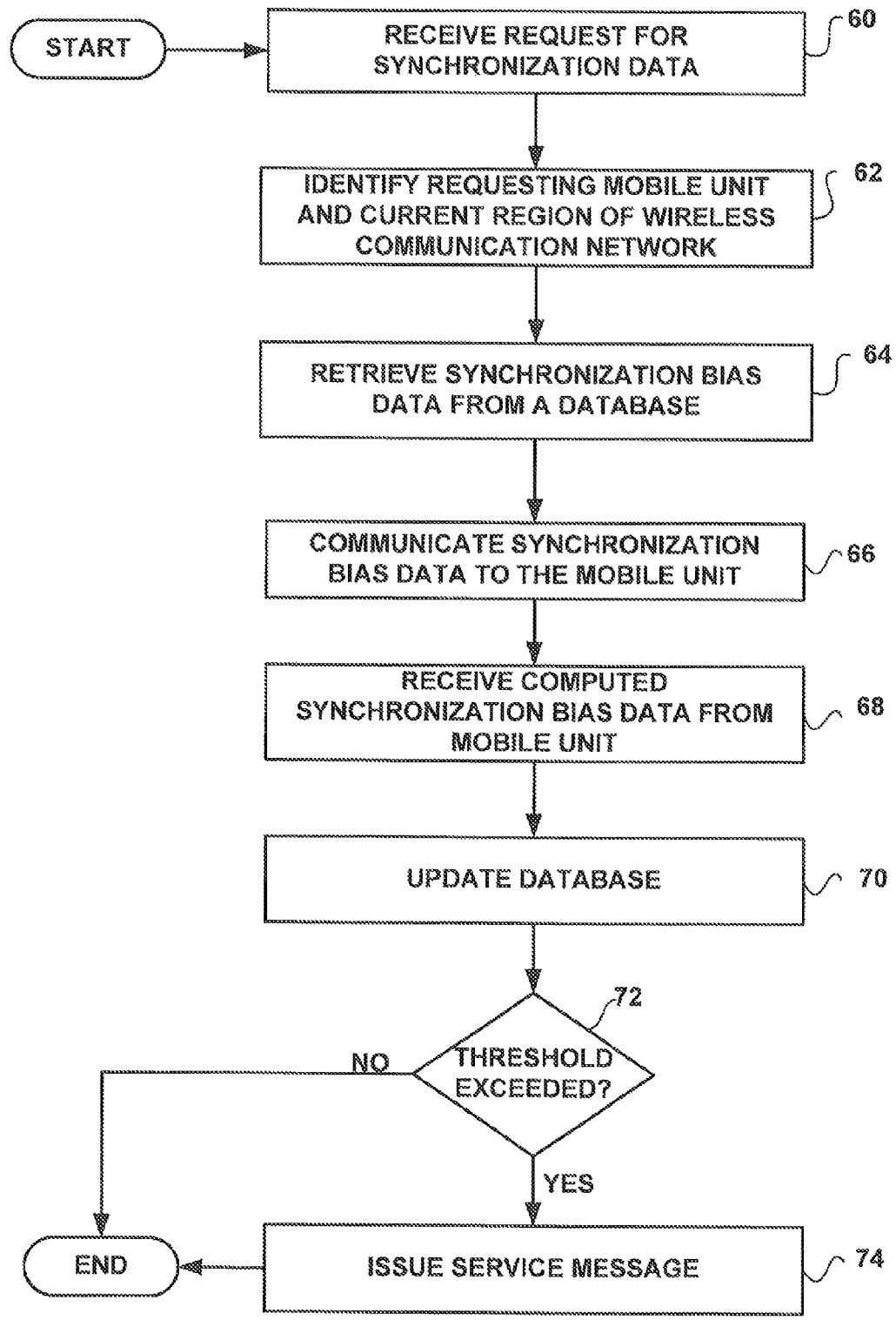
FIG. 4 is a flowchart further illustrating an exemplary process for calculating a pseudorange for a given satellite according to techniques described herein.

FIG. 4 is a flowchart further illustrating an exemplary mode of operation of server 14. Initially, server 14 receives a request from mobile unit 4 for synchronization data, typically via one or more base stations 8 (60). In response, server 14 may identify the requesting mobile unit 4, and the region of wireless communication network 7 within which the mobile unit is currently operating (62). Next, server 14 retrieves synchronization bias data, e.g., from a database, and communicates the data to mobile unit 4 (64, 66). As described above, server 14 may retrieve and communicate a system-wide synchronization bias, a synchronization bias specific to the requesting mobile unit, a synchronization bias specific to the current region, or combinations thereof.

In addition, once the mobile unit 4 has computed a position solution, server 14 may receive data that describes a computed synchronization bias (68). In other words, mobile unit 4 may make use of the synchronization bias, e.g., a range of system time difference, to resolve the actual system times of systems 5, 7. Server 14 may receive data defining the computed synchronization bias, and may update the database based on the received data (70). Server 14 may compare the computed synchronization bias to a predetermined threshold, e.g., a threshold difference in system times for synchronous environment 2 (72), and may issue a service message to a manufacturer or service provider for wireless communication system 7 based on the comparison (74). The service message may describe a determined functional status of one or more components within wireless communication system 7.

Although the techniques have been described generally in reference to computation of a position solution by a mobile unit, e.g., mobile unit 4 of FIG. 1, the techniques may be readily applied by positioning engines of other devices. For example, the techniques may be applied by other devices to assist in computation of position solutions for mobile units, e.g., distributed location servers, Position Determination Entities (PDEs), Location Measuring Units (LMUs), Serving Mobile Location Centers (SMLCs), Wireless Location Gateways (WLGs), Mobile Location Centers (MLCs), and the like.

Various embodiments have been described. These and other embodiments are within the scope of the following claims.

The invention claimed is:

1. A method of determining position, the method comprising:
    receiving signals from a satellite navigation system;
    receiving signals from a wireless communication system; and
    obtaining a synchronization bias constraint that defines a limit of a difference between a system time of the wireless communication system and a system time of the satellite navigation system; and
    determining a position solution for a mobile unit in an asynchronous environment as a function of the received signals, the synchronization bias constraint, and a number of independent measurements based on a position location technique for a synchronous environment, wherein the number of independent measurements is fewer than a minimum number of measurements for a position location technique in the asynchronous environment.

2. The method of claim 1, wherein receiving signals from the satellite navigation system comprises receiving signals from a Global Positioning System.

3. The method of claim 1, wherein receiving signals from the satellite navigation system comprises receiving signals from a Wide Area Augmentation System.

4. The method of claim 1, wherein receiving signals from the satellite navigation system comprises receiving signals from a Global Navigation Satellite System.

5. The method of claim 1, wherein receiving signals from the wireless communication system comprises receiving signals from a Code Division Multiple Access (CDMA) base station.

6. The method of claim 1, wherein receiving signals from the wireless communication system comprises receiving signals from a time division multiple access base station.

7. The method of claim 1, wherein obtaining the synchronization bias constraint comprises retrieving the synchronization bias constraint from a memory within the mobile unit.

8. The method of claim 1, wherein obtaining the synchronization bias constraint comprises receiving the synchronization bias constraint from a component of the wireless communication system.

9. The method of claim 1, wherein obtaining the synchronization bias constraint comprises receiving the synchronization bias constraint defining a bias constraint for the entire wireless communication system.

10. The method of claim 1, wherein obtaining the synchronization bias constraint comprises receiving the synchronization bias constraint defining a bias constraint for a region in which the mobile unit is located.

11. The method of claim 1, wherein obtaining the synchronization bias constraint comprises receiving the synchronization bias constraint specific to the mobile unit.

12. The method of claim 1, wherein obtaining the synchronization bias constraint comprises receiving the synchronization bias constraint associated with an identifier of the mobile unit.

13. The method of claim 1, wherein determining the position solution for the mobile unit comprises determining the position solution based on a hybrid position location technique.

14. The method of clan 1, wherein determining the position solution for the mobile unit comprises determining the position solution based on Advanced Forward Link Trilateration.

15. The method of claim 1, further comprising:
resolving system times of the satellite navigation system and the wireless communication system;
computing a synchronization bias based on the system times; and
transmitting the synchronization bias to a component of the wireless communication system.

16. The method of claim 1, further comprising:
receiving an additional independent measurement from one of the satellite navigation system or wireless communication system; and
applying Receiver Autonomous Integrity Monitoring (RAIM) to detect the presence of one or more erroneous measurements.

17. The method of claim 1, further comprising receiving altitude-aiding data from the wireless communication system, and wherein determining the position solution for the mobile unit is based on the altitude-aiding data.

18. A method of determining position, the method comprising:
determining a first number of independent positioning measurement based on signals from a satellite navigation system;
determining a second number of independent positioning measurements based on signals from a wireless communication system;
determining a synchronization bias constraint that constrains a system time of the wireless communication system in relation to a system time of the satellite navigation system;
identifying presence of redundant measurements based on a minimum number of measurements for a position location technique in a synchronous environment and the synchronization bias constraint;
applying Receiver Autonomous Integrity Monitoring (RAIM) to detect the presence of one or more erroneous measurements based on redundant measurements;
isolating erroneous measurements; and
determining a position solution for a mobile unit based on a hybrid position location technique in an asynchronous environment, and as a function of the independent positioning measurements, the synchronization bias constraint, a number of independent measurements at least equal to a minimum number of measurements for a position location technique in a synchronous environment, and excluding the isolated erroneous measurements, wherein the minimum number of independent measurements in the synchronous environment is fewer than a minimum number of measurements for a position location technique in the asynchronous environment.

19. An apparatus for determining position, the apparatus comprising:
a Satellite Positioning System (SPS) receiver configured to receive signals from a satellite positioning system;
a wireless communication system receiver configured to receive signals from a wireless communication system and further configured to receive a synchronization bias constraint that defines a limit of a difference between a system time of the wireless communication system and a system time of the satellite positioning system; and
a processor configured to determine a position solution for a mobile unit in an asynchronous environment as a function of the received signals, the synchronization bias constraint, and a number of independent measurements based on a position location technique for a synchronous environment, wherein the number of independent measurements is fewer than a minimum number of measurements for a position location technique in the asynchronous environment.

20. The apparatus of claim 19, wherein the synchronization bias constraint defines a bias constraint for the entire wireless communication system.

21. The apparatus of claim 19, wherein the synchronization bias constraint defines a bias constraint for a region in which the mobile unit is located.

22. The apparatus of claim 19, wherein the synchronization bias constraint is associated with an identifier of the mobile unit.

23. The apparatus of claim 19, wherein the processor determines presence of redundant measurements based on a minimum number of measurements for a position location technique in a synchronous environment and the synchronization bias constraint and applies Receiver Autonomous Integrity Monitoring (RAIM) to detect the presence of one or more erroneous measurements based on redundant measurements.

24. The apparatus of claim 19, wherein the processor determines system time of the SPS and system time of the wireless communication system, calculates a system bias, and communicates the system bias to a component in the wireless communication system.

25. The apparatus of claim 19, wherein the satellite positioning system comprises a Global Positioning System (GPS), and the wireless communication system comprises a Code Division Multiple Access (CDMA) wireless communication system.

26. The apparatus of claim 19, wherein the processor computes a latitude, a longitude and an altitude for the mobile unit.

27. An apparatus for determining position, the apparatus comprising:
means for receiving signals from a satellite navigation system;
means for receiving signals from a wireless communication system;
means for obtaining a synchronization bias constraint that defines a limit of a difference between a system time of the wireless communication system and a system time of the satellite navigation system; and
means for determining a position solution for a mobile unit in an asynchronous environment as a function of the received signals, the synchronization bias constraint, and a number of independent measurements based on a position location technique for a synchronous environment, wherein the number of independent measurements is fewer than a minimum number of measurements for a position location technique in the asynchronous environment.

28. The apparatus of claim 27, further comprising:
means for resolving system times of the satellite navigation system and the wireless communication system;
means for computing a synchronization bias based on the system times; and
means for transmitting the synchronization bias to a component of the wireless communication system.

29. The apparatus of claim 27, wherein at least one of the means for receiving signals from the satellite navigation system or means for receiving signals from the wireless communication system receives an additional independent measurement, and wherein the apparatus further comprises means for applying Receiver Autonomous Integrity Monitoring (RAIM) to detect the presence of one or more erroneous measurements.

30. The apparatus of claim 27, further comprising means for receiving altitude-aiding data from the wireless communication system, and wherein the means for determining the position solution determines the position solution for the mobile unit based on the altitude-aiding data.

31. A non-transitory, computer-readable medium encoded with one or more instructions, when executed by a computer, determining position, the instructions comprising:
instructions for receiving signals from a satellite navigation system;
instructions for receiving signals from a wireless communication system;
instructions for obtaining a synchronization bias constraint that defines a limit of a difference between a system time of the wireless communication system and a system time of the satellite navigation system; and
instructions for determining a position solution for a mobile unit in an asynchronous environment as a function of the received signals, the synchronization bias constraint, and a number of independent measurements based on a position location technique for a synchronous environment, wherein the number of independent measurements is fewer than a minimum number of measurements for a position location technique in the asynchronous environment.

* * * * *